United States Patent [19]

vanLeemput

[11] Patent Number: 4,864,854
[45] Date of Patent: Sep. 12, 1989

[54] GOLFER'S WIND INDICATOR AND CLUB SELECTION ASSISTANCE DEVICE

[76] Inventor: Roberto vanLeemput, 2 Orlando Ct., Laguna Niguel, Calif. 92677

[21] Appl. No.: 120,867

[22] Filed: Nov. 16, 1987

[51] Int. Cl.⁴ .......................... G01W 1/02; A63B 57/00
[52] U.S. Cl. ..................................... 73/189; 273/32 H
[58] Field of Search ............. 73/189; 273/32 B, 32 H; 235/78 G, 88 G

[56] References Cited

U.S. PATENT DOCUMENTS

| | | | |
|---|---|---|---|
| 2,491,176 | 12/1949 | Hammond | 73/189 |
| 2,889,707 | 6/1959 | Snider | 73/189 X |
| 3,744,714 | 7/1973 | Banner | 235/88 G |
| 4,136,394 | 1/1979 | Jones et al. | 273/32 H X |

Primary Examiner—Charles A. Ruehl
Attorney, Agent, or Firm—Stetina and Brunda

[57] ABSTRACT

A device for measuring wind direction and velocity and for instantaneously providing the golfer with an indication of the proper golf club to select under the measured wind conditions. The device comprises a means for indicating wind direction relative to the desired line of flight of the golf ball. Additionally, the device comprises a means for measuring wind velocity and is provided with precalibrated indicia relating the measured wind velocity to the number of numerical club designations by which the golfer should increase or decrease the club number which would normally be selected under windless conditions.

13 Claims, 1 Drawing Sheet

GOLFER'S WIND INDICATOR AND CLUB SELECTION ASSISTANCE DEVICE

BACKGROUND OF THE INVENTION

The present invention relates generally to the art of wind indication and measuring as it applies to the game of golf. Specifically, the invention relates to a portable wind direction and velocity indicator bearing precalibrated indicia to assist the golfer in selecting the proper golf club to be used in view of the existing wind conditions.

The game of golf is played outdoors in a variety of weather conditions. Indeed, weather conditions such as rain, wind, sun, and cold temperatures are uncontrolled variables which may frequently affect the golfer's game. Of course, the distance and/or trajectory of a golf shot may be adversely affected by the velocity and direction of any wind present. Thus, it is advantageous for the golfer to be able to accurately assess the direction and velocity of the wind prior to each shot so that he may make compensatory adjustments in stance, swing, and/or club selection. Even tail winds can actually reduce the distance of a golf shot if the wind is blowing sufficiently hard to have a leveling effect on the flight of the ball, thereby forcing the ball to the ground and shortening its flight distance.

Many golfers assess wind direction and velocity by holding a moistened finger into the air or tossing blades of grass into the air and thereafter watching the direction in which they blow. Such makeshift methods of assessing wind direction and velocity are highly subjective and inaccurate.

After assessing the wind direction and velocity, the golfer must decide what, if any, compensatory measures he wishes to take in dealing with the particular wind conditions. Experienced golfers will automatically undertake certain compensatory measures such as (a) assuming a stance which is wider than normal, (b) teeing the ball differently than normal, and/or (c) selecting a club which differs from that which would normally be used under windless circumstances.

It is generally believed that when hitting fairway woods or irons into a head wind, it is wise to select a club numbered lower than that which would normally have been selected by the golfer under windless circumstances. The lower numbered club will then produce a lower trajectory shot which will follow a more direct line of flight, thus attaining more distance into the head wind. Under extreme head wind conditions, the properly selected club may be three or four consecutive designations lower than that which would have been routinely selected by the same golfer on a still day. Conversely, when in the presence of a tail wind, the golfer will generally select a higher numbered club so as to loft the ball in a higher trajectory shot, thereby overcoming the effect of the tail wind as such tail wind tends to hold the shot closer to the ground. Thus, the specific club selected by the golfer will depend on the velocity and direction of the wind prevailing at the time.

Numerous devices have been devised for detecting wind velocity and direction in various settings. Such devices include weather vanes, wind socks, and various other meteorological instruments. However, there exists a need for a truly portable, hand-held wind velocity and directional measuring device which is specifically calibrated, and which bears appropriate indicia to indicate the number of numerical club designations which should be added to or subtracted from the club number which would normally have been selected by the golfer under windless conditions. As a result, the present invention comprises a golfer's wind indicator and club selection assistance device which, by the present state of art, is optimally designed to determine wind direction and velocity and, on the basis of such measured wind direction and velocity, to indicate the predetermined number of numerical designations to be added to or subtracted from the club number which would normally have been selected by the golfer under substantially windless conditions, in order to compensate for the presently measured wind conditions.

SUMMARY OF THE INVENTION

The present invention contemplates a new and novel golfer's wind indicator and club selection assistance device which overcomes the above-referred deficiencies in the art by providing a portable, accurate, and economical means for determining the direction and velocity of wind, and further providing the golfer with instantaneously exhibited, easily discernible, indicia of the club number which should be selected by the golfer under the particular wind conditions.

In accordance with the present invention, there is provided a golfer's wind indicator and club selection assistance device comprising a generally cylindrical hand grip having a wind direction and velocity measuring apparatus rotatably positioned thereon. The wind velocity and measuring apparatus comprises a generally round baseplate horizontally rotatably mounted on top of said cylindrical hand grip with a wind cup mounted centrally thereon by way of a flexible coil spring. One or more vertically extending wind fins or other wind receiving means may also be mounted on the upper surface of the horizontal base plate. Thus, the action of the wind on the wind cup and wind fin(s) will cause the rotatable base plate to rotate in a specific direction in which the wind is blowing and will also cause the spring supporting the wind cup to bend in the direction of the prevailing wind. Accordingly, the degree to which the spring is bent corresponds with the velocity of the wind blowing in the particular direction. The device is further provided with specifically calibrated indicia indicating the number of club designations by which the golfer should increase or decrease the club number which he would normally have selected under windless conditions. Thus, as winds of greater velocity will cause greater pressure on the wind cup, the resultant bowing of the flexible coil spring holding the wind cup causes an indicator to move to a specific point on a visual scale which has been calibrated in numerical golf club designation units. Thus, the number which the golfer reads from the scale should be added to or substracted from the club number which the golfer would normally have selected under the circumstances. For example, if the lie of the golf ball is such that the golfer would normally select a 5 iron and the wind indicator and club selection assistance device indicates a head wind requiring a "2 club" compensation, the golfer will then hit a 3 iron instead of a 5 iron. Likewise, if the device were to indicate a tail wind requiring a "1 club" compensation, the golfer would select a 6 iron instead of a 5 iron.

In accordance with still another aspect of the invention, the device is provided with a sighting means by which the device may be aligned with the desired line of flight of the golf ball. Thus, the indication of wind direction provided by the device will be viewed relative to the desired line of flight. Such directional differences must, of course, be taken into consideration by the golfer, along with the above-discussed measurement of wind velocity and adjustment of club selection.

In accordance with an even further aspect of the invention, the device may be provided with a separate set of wind direction indicia indicating the degree to which the rotatable platform member has rotated after the initial sighting of the device. Such wind direction indicia may routinely be graduated in "degrees" so as to indicate the angular difference in wind direction relative to the direction in which the device is positioned. For example, if the device is aimed directly at the pin and it indicates 10 degrees to the right of its original direction, such would indicate that the prevailing head wind is blowing at an angle of 10 degrees to the right of the straight line to the pin. The golfer may then adjust his stance and swing to compensate for such wind direction. At the time, the device will provide a reading of the wind in such direction and will automatically correlate such measured wind velocity to the number of numerical golf club designations by which the golfer should adjust club number which he would normally have selected windless conditions.

The principal object of the invention is to provide a portable wind indicator and club selection assistance device which will enable the golfer to accurately and instantaneously assess the prevailing wind conditions and to read from the device a specific indication of the number of club designations by which the golfer may compensate for the wind velocity.

Another object of the invention is to provide a golfer's wind indicator and club selection assistance device which is truly portable and is small enough to fit inside a standard golf bag.

Yet another object of the present invention is to provide a golfer's wind indicator and club selection assistance device which is designed and constructed to provide accurate measurements of wind direction and velocity while at the time being able to withstand routine handling on the golf course, including placement inside various pockets of a golf bag, without permanently bending or breaking.

A further object of the invention is to provide a wind indicator and club selection assistance device which may be provided with specifically calibrated visual indicia which are appropriate for sports or human endeavors, other than golf, wherein selection of a utensil or tool must be made on the basis of the present wind direction and/or velocity.

A still further object of the invention is to provide a device whereby the golfer may accurately discern the direction of wind relative to the desired straight line of flight of the golf ball, thereby enabling the golfer to make corresponding adjustments in stance and swing, such that the shot will draw into any prevailing wind.

Further objects and advantages of the invention will be apparent from the following detailed description of a preferred species of the invention, and from the accompanying drawings.

DESCRIPTION OF THE PREFERRED EMBOIDMENTS

Figure 1:
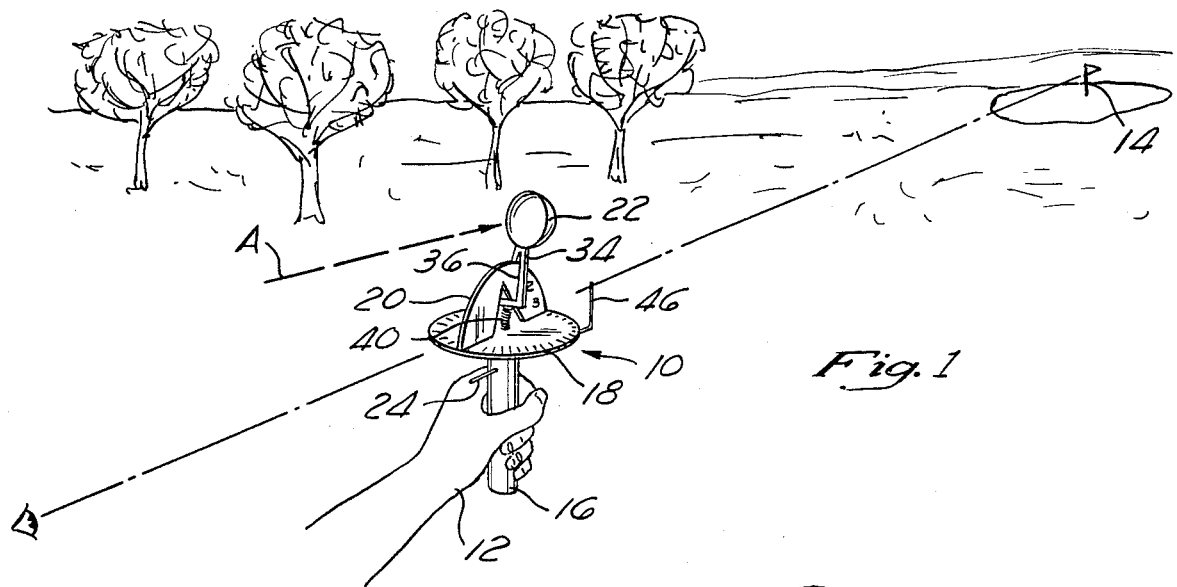
FIG. 1 is a perspective view of the golfer's wind indicator and club selection assistance device held in a human hand and along a desired line of flight.

Referring now to the drawings wherein the showing is for the purpose of illustrating a presently preferred embodiment of the invention and not for the purposes of limiting the inventive concept in any way, FIG. 1 depicts a golfer's wind indicator and club selection assistance device 10 being held in the golfer's hand 12 and aimed along a desired line of flight which terminates at a flag-bearing pin 14. The golfer's wind indicator and club selection assistance device 10 comprises a generally cylindrical hand grip 16 having a circular horizontal platform member 18 rotatably mounted thereon such that when cylindrical hand grip 16 is held substantially vertically within the golfer's hand 12, as shown, the horizontal platform member 18 is free to rotate on the top end of cylindrical hand grip 16. An arcuate wind fin/indicia display panel 20 extends upwardly from, and is rigidly affixed to, the upper surface of horizontal platform member 18. Additionally, a wind cup 22 is movably mounted at the center point of horizontal platform member 18 such that the action of wind on wind cup 22, denoted by arrow A, will cause wind cup 22 to be driven in the direction of arrow A. Such movement of wind cup 22 causes the wind cup support member 34 to pass over the surface of the arcuate wind fin/indicia display panel 20. Thus, an indication of the wind velocity can be observed by sighting of the position of the support member 34 along the arcuate length of the display panel 20 which may be taken into account by the golfer when adjusting his stance and swing.

Figure 2:
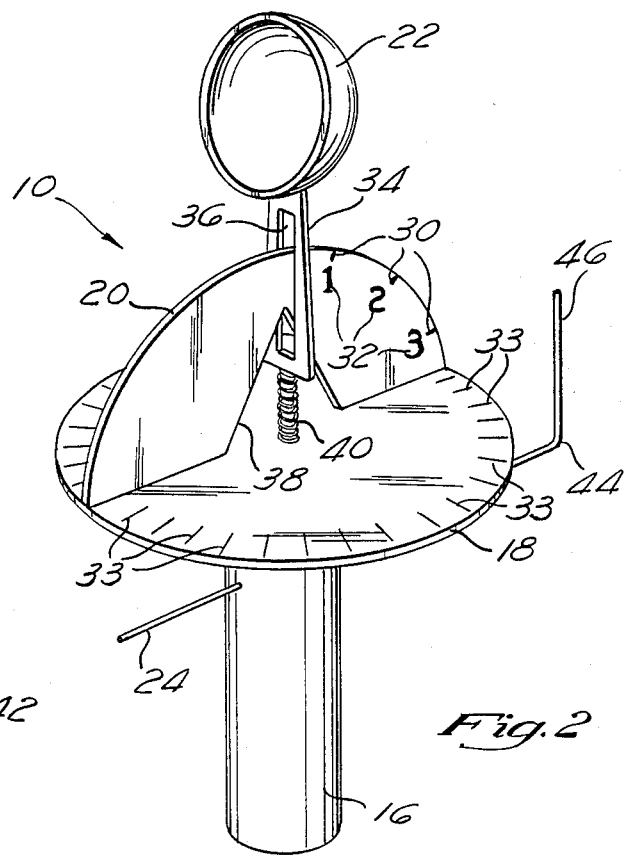
FIG. 2 is an enlarged perspective view of the golfer's wind indicator and club selection assistance device.

The specific design of the golfer's wind indicator and club selection assistance device may be more fully appreciated from the enlarged view of FIG. 2 wherein there is shown cylindrical hand grip 16 with circular horizontal platform member 18 rotatably mounted on top thereof. Wind fin/indicia display panel 20 is mounted along the diametrical mid-line of the upper surface of circular horizontal platform 18 and is seen to be provided with specifically spaced hashmarks or graduation lines 30 on one side thereof. Club number indicia 32 appear next to each hashmark 30. Additionally, circular horizontal platform 18 is provided with angular markings 33 (i.e., 10-degree divisions) on the upper surface thereof. Such angular markings 33 indicate the degree to which the platform 18 has rotated due to the action of wind on the device.

Wind cup 22 is firmly affixed to the upper end of wind cup support member 34. Wind cup support member 34 is provided with a generally rectangular aperture 36 extending therethrough. Arcuate wind fin/indicia panel 20 is provided with a corresponding, generally angular, notch 38 in the underside thereof. Arcuate wind fin/indicia display panel 20 is passed through the rectangular aperture 36 of wind cup support member 34, and the base of arcuate wind fin/indicia display panel 20 is firmly affixed to the upper surface of rotatable panel 18. The vertical wind cup support member 34 is flexibly attached to the approximate center point of circular platform 18 by coil spring 40. A wire 24 or the like extends horizontally through cylindrical hand grip 16. Wire 24 is provided with an upward 90-degree bend 44 at one end thereof forming a vertical upright segment 46 which functions as a sighting indicator, thereby enabling the user to sight the device 10 in the direction of the intended line of flight of the golf ball. The wind fin/indicia display panel 20 may be initially aligned with upright segment 46 of the wire 24. Upright segment 46 may, in turn, be aligned with the desired line of flight (e.g., the pin). The degree to which the horizontal platform 18 rotates may then be discerned from the position of markings 33 relative to upright segment 46. Thus, if the platform 18 rotates 20 degrees to the right, such would indicate a head wind blowing from a direction 20 degrees to the right of the desired straight line flight to the pin. The golfer may then utilize this information to adjust his stance and/or swing in order to draw the ball into the wind.

Figure 3:
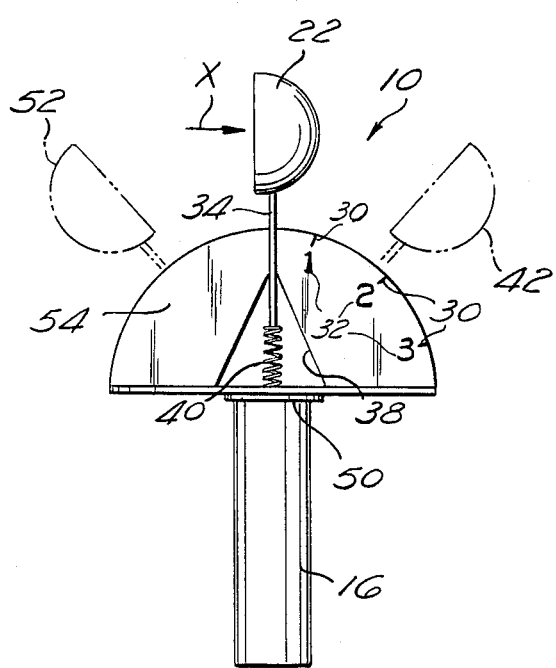
FIG. 3 is a side elevational view of the golfer's wind indicator and club selection assistance device.

The manner in which the device may be used to indicate the proper club selection is more fully appreciated from the side elevational view of FIG. 3 wherein there is shown the device 10 comprising cylindrical hand grip 16 having a horizontal flange 50 positioned on the top end thereof. Circular horizontal platform 18 is rotatably horizontally juxtapositioned on top of flange 50. Wind cup 22 is attached to wind cup support member 34 which is in turn flexibly mounted at the center point of circular platform 18 by way of coil spring 40 having a linear spring constant in flexion. The action of wind on wind cup 22, denoted by arrow X, flexes coil spring 40 and causes wind cup 22 to pivot and travel to a position indicated by broken lines 42. Wind cup support member 34 traverses the face of wind fin/indicia display panel 20. Thus, in accordance with the illustrated traveled position 42 of wind cup 22, wind cup support member 34 is shown to be advanced to a point which indicates a 2-club designation adjustment as from the corresponding indicia display. Accordingly, the golfer will select a club bearing a designation two less than that which would normally have been selected (i.e., a 3 iron instead of a 5 iron.) This, of course, presumes that the wind being measured is coming from direction ahead of the golfer, that is, a "head wind". If, however, the wind had been more aptly characterized as a tail wind, the golfer will generally elect to make a 2-club increase in club designation (a 7 iron instead of a 5 iron). Such selection of a higher numbered club will result in additional lift on the ball and will counter the effect of the tail wind.

FIG. 3 further shows an alternative position 52 of wind cup 22. Such alternative position 52 may be accomplished by rotatably mounting wind cup 22 on top of wind cup support member 34, such that wind cup 22 may receive either a head wind or a tail wind, thereby eliminating the need for turning of the device to capture the wind. Further indicia may be shown on the uncalibrated side 54 of wind fin/indicia display panel 20 in the event such multidirectional capability is provided to wind cup 22.

This invention has been described with reference to a preferred embodiment thereof. Obviously, modifications and alterations will occur to those skilled in the art upon reading and understanding of the specification. It is my intention to include all such modifications and alterations insofar as they come within the scope of the appended claims or the equivalents thereof.

What is claimed is:

1. A golfer's wind indicator and club selection assistance device comprising:
   a means for measuring wind velocity;
   a means for measuring wind direction; and
   a precalibrated means operative to provide a substantially instantaneous indication of the appropriate number of numerical designations by which the golfer should alter his club selection in order to compensate for the measured wind velocity.

2. The device of claim 1 wherein said means for measuring wind velocity comprises a concave cup-like structure bendably mounted on the upper surface of a generally horizontal base member such that action of wind on said concave cup-like structure will cause said concave cup-like structure to bend in the direction of said wind.

3. The device of claim 2 wherein said precalibrated means comprises club selection visual indicia formed on said device, said club selection indicia providing a visually discernible correlation between the wind velocity measured by said device and the adjustment in golf club selection to be made by the golfer in view of the said measured wind velocity.

4. The device of claim 2 wherein said horizontal base member is rotatably mounted on top of a generally cylindrical hand grip and provided with a wind fin emanating upwardly therefrom such that the action of wind on said concave cup-like structure and said wind fin will cause said horizontal member to rotate, such that said wind fin will generally align with the prevailing wind direction.

5. The device of claim 4 including a set of visual indicia indicating the degree to which said horizontal platform member has rotated relative to its original position, thereby indicating the wind direction relative to a specific direction of reference.

6. The device of claim 2 including a sighting apparatus whereby the device may be aimed in a specific direction.

7. The device of claim 6 wherein said sighting apparatus is a generally straight, wire-like member extending horizontally through the center of said device and having a 90-degree upward bend at one end thereof such that a terminal portion of said wire-like member will extend upwardly and generally perpendicular to said horizontal base member.

8. The device of claim 3 wherein said club selection indicia comprise a series of consecutive numerals positioned in predetermined spacial relationship on said device.

9. The device of claim 8 wherein said club selection indicia are displayed on the device such that the position of said means for measuring wind velocity may be viewed concurrently with said set of club selection indicia, thereby enabling the user of the device to visually relate the position of said means for measuring wind velocity to a particular club selection indicium formed on said device.

10. The device of claim 3 wherein said club selection indicia are specifically positioned on said device as to provide a visual indication of the corresponding adjustment in club number designation desirable in view of the wind induced bending of said cup-like structure.

11. The device of claim 2 wherein a coil spring is positioned between the concave cup-like structure and said horizontal base member so as to render said concave cup-like structure freely bendable in response to the action of the wind on said concave cup-like structure.

12. The device of claim 8 wherein said club selection indicia comprise the numbers 1, 2 and 3, thereby encompassing a range of plus/minus 3 numerical club designations.

13. The device of claim 1 wherein said device is sized to fit conveniently within the utility pocket of a golf bag.

* * * * *